(12) United States Patent
Kang et al.

(10) Patent No.: US 12,158,187 B2
(45) Date of Patent: Dec. 3, 2024

(54) ELECTROMECHANICAL BRAKE SYSTEM AND CONTROL METHOD THEREOF

(71) Applicant: HL MANDO CORPORATION, Pyeongtaek (KR)

(72) Inventors: Gunwoo Kang, Uiwang (KR); Jaehoon Jang, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 363 days.

(21) Appl. No.: 17/746,969

(22) Filed: May 18, 2022

(65) Prior Publication Data
US 2022/0373046 A1 Nov. 24, 2022

(30) Foreign Application Priority Data
May 21, 2021 (KR) ........................ 10-2021-0065673

(51) Int. Cl.
| | |
|---|---|
| *B60T 1/00* | (2006.01) |
| *F16D 55/226* | (2006.01) |
| *F16D 65/18* | (2006.01) |
| *F16D 121/24* | (2012.01) |
| *F16D 125/40* | (2012.01) |

(52) U.S. Cl.
CPC ........... *F16D 65/18* (2013.01); *F16D 55/226* (2013.01); *F16D 2121/24* (2013.01); *F16D 2125/40* (2013.01)

(58) Field of Classification Search
CPC .... F16D 55/226; F16D 65/18; F16D 2121/24; F16D 2125/40; F16D 2127/06; B60T 1/065; B60T 13/746
See application file for complete search history.

(56) References Cited

U.S. PATENT DOCUMENTS

| | | | | |
|---|---|---|---|---|
| 6,907,965 | B2 * | 6/2005 | Peter ..................... | B60T 13/746 188/72.8 |
| 10,668,912 | B2 * | 6/2020 | Kirchner ................ | B60T 1/005 |
| 11,168,754 | B2 * | 11/2021 | Sayama ............. | F16H 63/3433 |

(Continued)

FOREIGN PATENT DOCUMENTS

WO WO-2020158587 A1 * 8/2020 .............. B60T 13/74

*Primary Examiner* — Thomas W Irvin
(74) *Attorney, Agent, or Firm* — Harvest IP Law, LLP

(57) ABSTRACT

An electromechanical brake system includes: a pair of pad plates to which a brake pad is attached, respectively, to press a disc that rotates with a wheel; a carrier on which the pair of pad plates are installed; a caliper housing slidably installed on the carrier; a piston movably installed in forward and backward direction inside the caliper housing; a power transfer part configured to press the pair of pad plates onto the disc by moving the piston; a brake actuator including a drive motor configured to provide a rotational force of the drive motor to the piston, and a reduction gear part configured to decelerate the rotational force of the drive motor and transmit the decelerated rotational force to the power transfer part; a parking actuator connected to the brake actuator to maintain a parking braking state of a vehicle; a force sensor configured to detect a clamping force due to a contact between the disc and the brake pad; and a controller configured to control the brake actuator and the parking actuator, wherein the controller is configured to control the parking actuator based on the clamping force detected through the force sensor.

10 Claims, 10 Drawing Sheets

(56) References Cited

U.S. PATENT DOCUMENTS

| | | | |
|---|---|---|---|
| 11,932,214 B2* | 3/2024 | Baek | F16D 55/227 |
| 2017/0001604 A1* | 1/2017 | Al-Regib | B60T 1/062 |
| 2017/0088111 A1* | 3/2017 | Kirchner | F16D 63/006 |
| 2018/0238408 A1* | 8/2018 | Song | F16D 65/18 |
| 2021/0239211 A1* | 8/2021 | Stöhr | F16D 63/006 |
| 2022/0024426 A1* | 1/2022 | Baek | F16D 65/18 |
| 2022/0153251 A1* | 5/2022 | Yokoyama | F16D 63/006 |
| 2022/0307562 A1* | 9/2022 | Yoshizu | F16D 65/183 |
| 2022/0396253 A1* | 12/2022 | Karajgi | B60T 13/741 |
| 2023/0132084 A1* | 4/2023 | Kim | F16D 65/18 |
| | | | 188/72.3 |
| 2023/0150467 A1* | 5/2023 | Chelaidite | B60T 13/746 |
| | | | 188/72.8 |
| 2023/0166697 A1* | 6/2023 | Boo | F16D 63/006 |
| | | | 188/72.3 |

\* cited by examiner

ELECTROMECHANICAL BRAKE SYSTEM AND CONTROL METHOD THEREOF

CROSS-REFERENCE TO RELATED APPLICATION

This application is based on and claims priority under 35 U.S.C. § 119 to Korean Patent Application No. 10-2021-0065673, filed on May 21, 2021 in the Korean Intellectual Property Office, the disclosure of which is incorporated herein by reference.

BACKGROUND

1. Technical Field

The disclosure relates to an electromechanical brake system and a control method thereof that may perform braking and parking of a vehicle by power of a motor.

2. Background Art

In general, when a driver's braking intention is detected, an electromechanical brake system presses brake pads onto a brake disc, installed on a vehicle wheel, by moving a piston using a motor and a reducer to brake vehicle wheels.

In the electromechanical brake system, both a service brake function for providing a braking force while driving and a parking brake function for holding a vehicle stopped while parking are required.

When the parking brake function is performed, a torque generated from a motor is increased through a reducer to generate a clamping force required for parking by a mechanical system in a caliper. In order to maintain the generated clamping force, because a piston is required to be fixed against a reaction force from brake pads, a movement of the reducer that rotates by receiving a rotational force of the motor is limited.

Conventionally, the movement of the reducer is limited by using a stop ring and a solenoid lever. Here, the stop ring rotates together with a rotation shaft of any one of the gears of the reducer, and the solenoid lever moves forward and backward by a solenoid and limits the rotation of the rotation shaft of the stop ring by engaging with an outer circumferential surface of the stop ring.

Conventionally, an estimation of a clamping force depends on a current of a motor, leading to an inaccurate estimation. Moreover, in a state where a movement of a reducer is limited by a solenoid, a clamping force may not be precisely estimated only using the current of motor. Accordingly, when a solenoid lever does not accurately engage with or is disengaged with a stop ring, these may not be detected, causing the stop ring incapable of holding a gear.

SUMMARY

An aspect of the disclosure provides an electromechanical brake system and a control method thereof that may stably and accurately implement a parking brake function.

Additional aspects of the disclosure will be set forth in part in the description which follows and, in part, will be obvious from the description, or may be learned by practice of the disclosure.

According to an aspect of the disclosure, there is provided an electromechanical brake system, including: a pair of pad plates to which a brake pad is attached, respectively, to press a disc that rotates with a wheel; a carrier on which the pair of pad plates are installed; a caliper housing slidably installed on the carrier; a piston movably installed in forward and backward direction inside the caliper housing; a power transfer part configured to press the pair of pad plates onto the disc by moving the piston; a brake actuator including a drive motor configured to provide a rotational force of the drive motor to the piston, and a reduction gear part configured to decelerate the rotational force of the drive motor and transmit the decelerated rotational force to the power transfer part; a parking actuator connected to the brake actuator to maintain a parking braking state of a vehicle; a force sensor configured to detect a clamping force due to a contact between the disc and the brake pad; and a controller configured to control the brake actuator and the parking actuator, wherein the controller is configured to control the parking actuator based on the clamping force detected through the force sensor.

The parking actuator includes: a parking gear connected to the brake actuator and provided rotatably together; a parking lever having one side hinged and another side provided to be engaged with the parking gear; a parking motor configured to generate power; a power conversion part including a spindle member configured to rotate by receiving a rotational driving force of the parking motor, and a nut member screwed with the spindle member to move forward and backward; and a pressing part installed on the nut member and configured to press the parking lever by forward and backward movement of the nut member.

The controller is configured to control the parking actuator, when the clamping force detected through the force sensor reaches a target clamping force in a parking apply mode.

When the clamping force detected through the force sensor reaches the target clamping force, the controller is configured to engage the parking lever with the parking gear by rotating the parking motor of the parking actuator in one direction to perform a parking-on operation.

When the clamping force detected through the force sensor is lower than the target clamping force after the parking-on operation is completed, the controller is configured to separate the parking lever from the parking gear by rotating the parking motor of the parking actuator in an opposite direction to perform a parking-off operation, and when the clamping force detected through the force sensor reaches the target clamping force, the controller is configured to perform the parking-on operation again.

According to another aspect of the disclosure, there is provided a control method of an electromechanical brake system including a pair of pad plates to which a brake pad is attached, respectively, to press a disc that rotates with a wheel, a carrier on which the pair of pad plates are installed, a caliper housing slidably installed on the carrier, a piston movably installed in forward and backward direction inside the caliper housing, a power transfer part configured to press the pair of pad plates onto the disc by moving the piston, a brake actuator including a drive motor configured to provide a rotational force to the piston, and a reduction gear part configured to decelerate the rotational force of the drive motor and transmit the decelerated rotational force to the power transfer part, and a parking actuator connected to the brake actuator to maintain a parking braking state of a vehicle, the control method including: detecting a clamping force due to a contact between the disc and the brake pad through a force sensor; and controlling the parking actuator based on the clamping force detected through the force sensor.

The controlling of the parking actuator operates the parking actuator for a parking-on operation, when the clamping force detected through the force sensor reaches a target clamping force in a parking apply mode.

When the clamping force detected through the force sensor is lower than the target clamping force after the parking-on operation with respect to the parking actuator is completed, the controlling of the parking actuator operates the parking actuator for a parking-off operation, and when the clamping force detected through the force sensor reaches the target clamping force, operates the parking actuator for the parking-on operation again.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
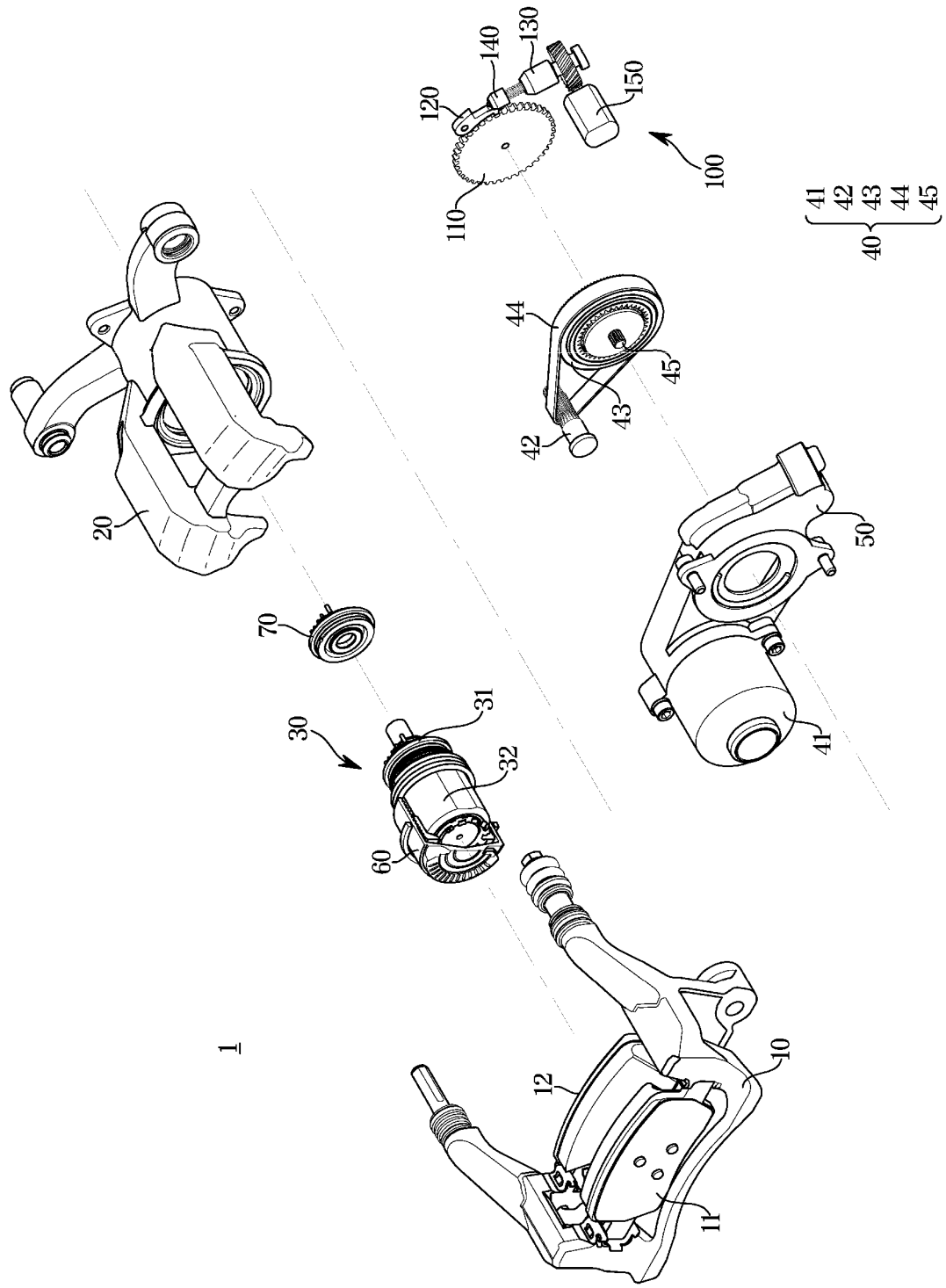
FIG. 1 is a perspective view illustrating an electromechanical brake system according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 is a perspective view illustrating an electromechanical brake system according to an embodiment.

Referring to FIG. 1, an electromechanical brake system 1 may include a carrier 10 on which a pair of pad plates 11 and 12 are installed to press a disc that rotates with a wheel of a vehicle, a caliper housing 20 slidably installed on the carrier 10 to operate the pair of pad plates 11 and 12, a piston 60 movably installed in forward and backward direction inside the caliper housing 20, a brake actuator 40 that generates a rotational driving force in a drive motor 41 and includes a reduction gear part, a power transfer part 30 that converts the rotational driving force provided from the brake actuator 40 into a linear motion and transmits the linear motion to the piston 60 to implement forward and backward movement of the piston 60 in an axial direction, a parking actuator 100 connected to the brake actuator 40 to perform parking braking, and a controller (electronic control unit (ECU), not shown) that controls operations of the brake actuator 40 and the parking actuator 100.

A brake pad is attached to an inner surface of each of the pair of pad plates 11 and 12. The pair of pad plates 11 and 12 include an inner pad plate 11 whose outer surface is in contact with a front surface (left side when viewed from FIG. 1) of the piston 60, and an outer pad plate 12 whose outer surface is in contact with a finger part of the caliper housing 20 so that the pair of pad plates 11 and 12 are slidably installed on the carrier 10.

The caliper housing 20 includes the finger part for operating the outer pad plate 12 and a cylinder part in which the piston 60 is installed. The caliper housing 20 is slidably coupled to the carrier 10. When the vehicle is braked, the caliper housing 20 slides from the carrier 10 by a reaction force caused by a movement of the piston 60 and moves toward the disc, and thus the outer pad plate 12 approaches the disc by the finger part and may press the disc.

The brake actuator 40 transmits the rotational driving force for moving the piston 60 to the piston 60 to implement general braking and parking braking.

The brake actuator 40 includes the drive motor 41 and the reduction gear part. The drive motor 41 generates the rotational driving force, and the reduction gear part connected to the drive motor 41 slows down a speed by adjusting a gear ratio but amplifies a torque. In this instance, the reduction gear part may include a drive gear 42 coupled to a rotation shaft of the drive motor 41, and a reduction gear 43 that is connected to the drive gear 42 and transmits power to the power transfer part 30. The drive gear 42 and the reduction gear 43 may be connected by a gear belt 44. Also, a rotation shaft of the reduction gear 43 may be coaxially connected to a spindle unit 31 and a parking gear 110.

The power transfer part 30 may include the spindle unit 31 that is connected to the reduction gear part and rotates together with the reduction gear part, and a nut unit 32 that is screwed to the spindle unit 31 and moves forward and backward inside the piston 60.

The parking actuator 100 is connected to the brake actuator 40 and maintains a braking state of the vehicle. The parking actuator 100 holds the braking state by locking the parking gear 110 connected to the brake actuator 40 in a state where the piston 60 presses the pad plate 11. More specifically, when parking braking is performed, the pad plate 11 is pressed by the piston 60 by the operation of the brake actuator 40, and thus the brake pads come into close contact with the disc. In this instance, the parking actuator 100 may maintain the braking state of the vehicle by fixing the parking gear 110 connected to the reduction gear part.

Figure 2:
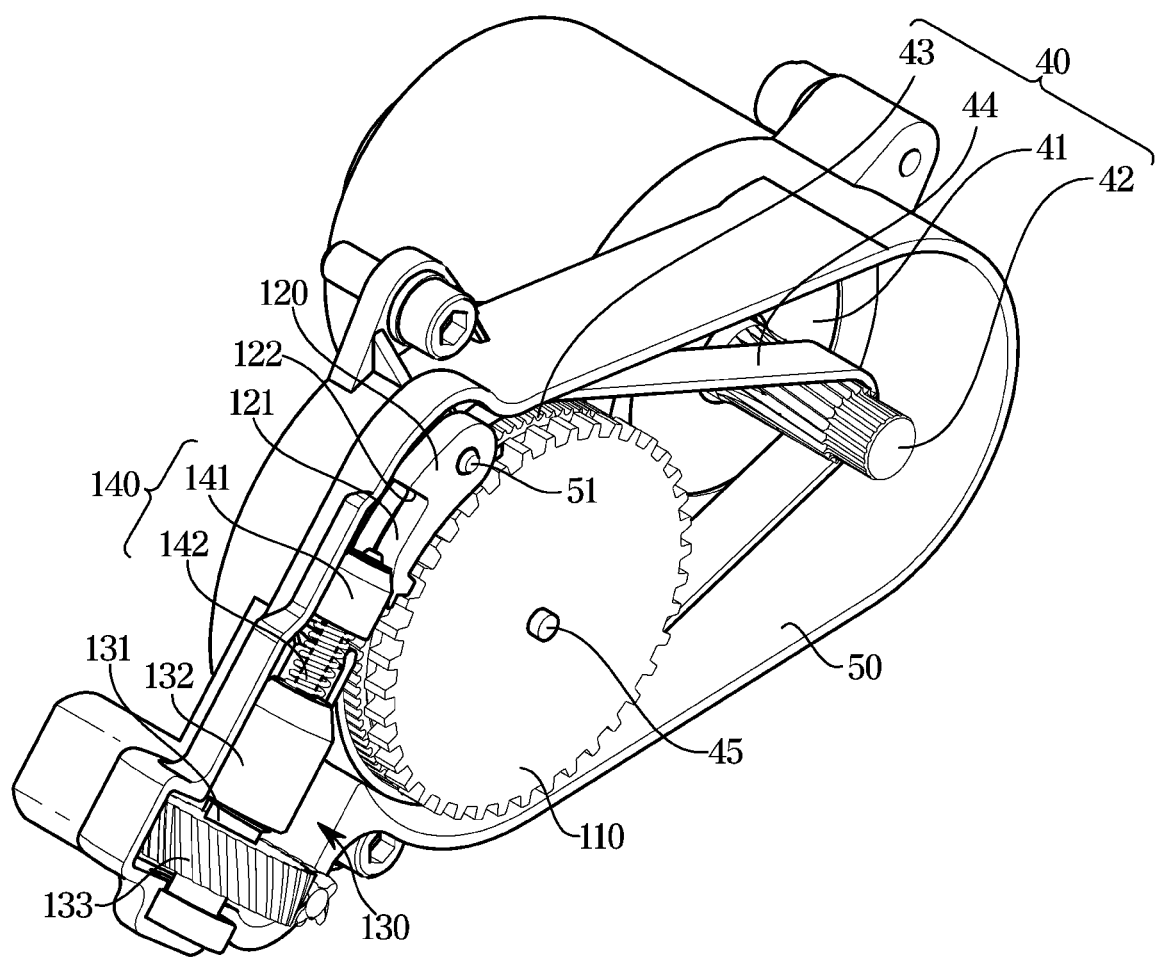
FIG. 2 is a perspective view illustrating a parking actuator of an electromechanical brake system according to an embodiment.
Figure 3:
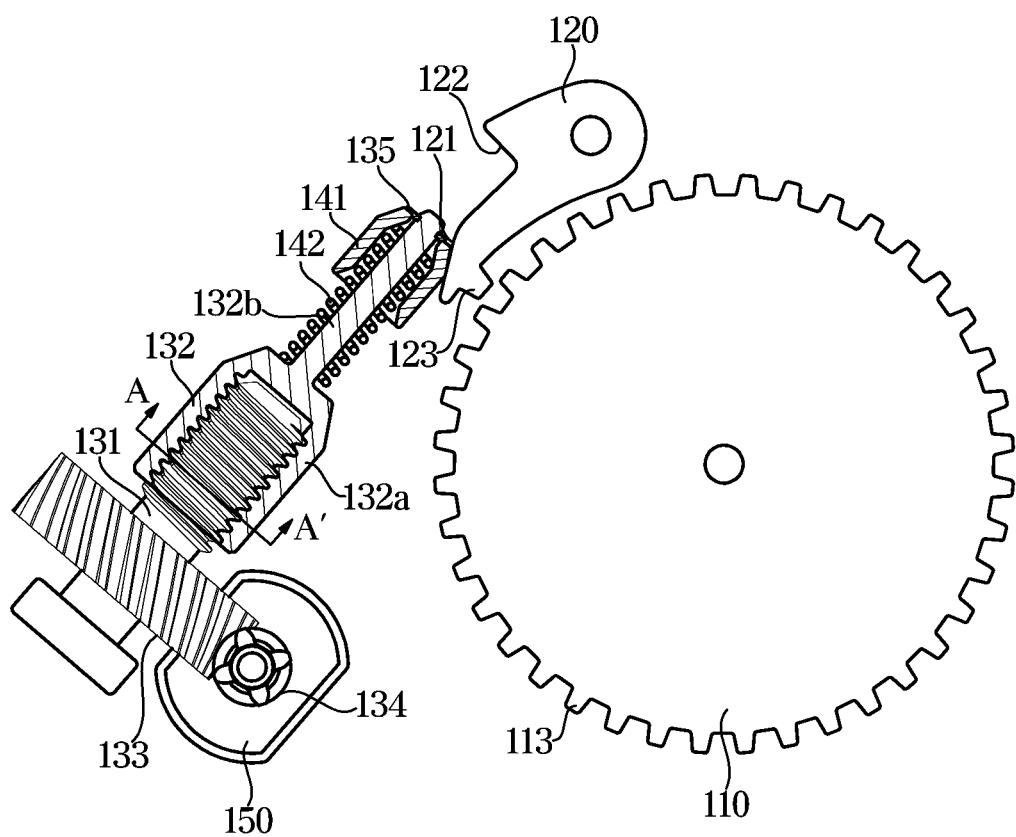
FIG. 3 is an enlarged cross-sectional view illustrating a main part of a parking actuator of an electromechanical brake system according to an embodiment.

FIG. 2 is a perspective view illustrating a parking actuator of an electromechanical brake system according to an embodiment. FIG. 3 is an enlarged cross-sectional view illustrating a main part of a parking actuator of an electromechanical brake system according to an embodiment.

Referring to FIGS. 2 and 3, the parking actuator 100 may include the parking gear 110, a parking lever 120, a parking motor 150, a power conversion part 130, and a pressing part 140. The parking gear 110 is connected to the brake actuator 40 and rotates together with the brake actuator 40. The parking lever 120 has one side which is hinged and another side provided to be engaged with the parking gear 110. The parking motor 150 generates power and the power conversion part 130 converts a rotational motion of the parking motor 150 into a linear motion. The pressing part 140 is installed on a nut member 132 and presses the parking lever 120 by forward and backward movement of the nut member 132.

Here, an operation for maintaining a parking braking state by fixing the parking gear 110 through an operation of the parking actuator 100 is referred to as 'parking-on', and an operation of releasing the fixing of the parking gear 110 by operating the parking actuator 100 is referred to as 'parking-off'.

The parking gear 110 is connected to the reduction gear part and rotates together when the reduction gear part rotates. When the reduction gear part is fixed, the parking gear 110 is fixed together. The parking gear 110 may be coaxially connected to the reduction gear 43 and rotate together with the reduction gear 43. However, the parking gear 110 may be variously provided. For example, the parking gear 110 may be directly connected to the drive motor 41, or be provided on another shaft through another gear and the reduction gear 43. Also, when the parking gear 110 is connected to the brake actuator 40 and driving of both the parking gear 110 and the brake actuator 40 are limited together, it is to be understood in the same way as in this embodiment.

The parking gear 110 may be provided with a plurality of gear teeth 113 on an outer circumferential surface thereof to be able to mesh with gear teeth 123 of the parking lever 120.

An outer diameter of the parking gear 110 may be preferably provided in a similar size to an outer diameter of the reduction gear 43, because the larger the outer diameter of the parking gear 110, the greater number of gear teeth 113 of the parking gear 110 as well as the higher the sensitivity of the parking lever 120 to mesh.

The parking lever 120 has one side hinged to a housing 50, and another side provided to be engaged with the parking gear 110 by rotating toward the parking gear 110 side. Specifically, the parking lever 120 may be hinged to the housing 50 by a rotation pin 51 inserted into the housing 50 that surrounds the parking actuator 100. Also, the parking lever 120 may be elastically supported by a torsion spring (not shown) that is inserted into the rotation pin 51 and separates the parking lever 120 from the parking gear 110. In this instance, the torsion spring (not shown) has one end hinged to the housing 50 and another end supported by the parking lever 120. Accordingly, when a pressing member 141 moves backward, the parking lever 120 is spaced apart from the parking gear 110 to provide an elastic force to the parking lever 120, thereby may release parking braking.

One surface of the parking lever 120 facing the parking gear 110 is provided with the gear teeth 123 meshing with the gear teeth 113 of the parking gear 110, and another surface thereof is provided with a pressing surface 121 which is in close contact with the pressing member 141, and a stepped surface 122 formed from the pressing surface 121 in a stepped manner.

The parking lever 120 may be provided such that a width thereof gradually decreases along a longitudinal direction. The pressing surface 121 may be bent to be gradually pressed by the pressing member 141 when the pressing member 141 moves forward. That is, the pressing surface 121 may be bent so that the parking lever 120 gradually rotates toward the parking gear 110, when the pressing member 141 moves forward.

The stepped surface 122 may be formed in a stepped manner from the pressing surface 121 to prevent the nut member 132 from moving forward excessively. Specifically, the stepped surface 122 is provided on an extension line from the forward and backward direction of the nut member 132. When the nut member 132 moves forward excessively, the stepped surface 122 comes into contact with one end of a pin 132B, thereby may prevent the forward movement of the nut member 132. Accordingly, the nut member 132 may be prevented from advancing excessively, being unscrewed and deviating from a spindle member 131.

The parking motor 150 generates power for driving the parking actuator 100. In this instance, because the parking motor 150 requires to provide only power for being able to press the parking lever 120 through the power conversion part 130 and the pressing part 140, the parking motor 150 may be provided as a direct current (DC) motor having a relatively low output, compared to the drive motor 41 of the brake actuator 40.

The power conversion part 130 converts the rotational motion of the parking motor 150 into a linear motion to press and release a pressure on the parking lever 120.

Specifically, the power conversion part 130 includes the spindle member 131, the nut member 132, a first worm gear 134 and a second worm gear 133. The spindle member 131 rotates by receiving power of the parking motor 150, and the nut member 132 is screwed to the spindle member 131 and moves forward and backward. The first worm gear 134 is provided on a rotation shaft of the parking motor 150, the second worm gear 133 engages with the first worm gear 134, and the spindle member 131 is penetratingly coupled to the second worm gear 133.

The nut member 132 may include a nut body 132A and the pin 132B. The nut body 132A includes a female thread engaged with a male thread formed on an outer circumferential surface of the spindle member 131. The pin 132B is extended from the nut body 132A in a longitudinal direction and is installed to penetrate through the pressing member 141. In this instance, a stopper 135 extending outwardly in a radial direction may be coupled to an end of the pin 132B to prevent the pressing member 141 from being deviated. Accordingly, after an elastic member 142 in a form of a coil spring and the pressing member 141 in a cylindrical shape are sequentially inserted into the pin 132B, the stopper 135 is coupled so that the pressing member 141 is movable within a length range of the pin 132B.

A rotation prevention surface may be provided on one side of an outer circumferential surface of the nut body 132A so that the nut member 132 does not rotate together when the spindle member 131 rotates. The rotation prevention surface may be formed to correspond to a rotation prevention part (not shown) provided in the housing 50 so that the nut member 132 does not rotate together when the spindle member 131 rotates. For example, the rotation prevention surface may be formed to be recessed on one side of the outer circumferential surface of the nut body 132A, and the rotation prevention part (not shown) protruded in a cylindrical space may be provided in a portion that receives the nut body 132A in the housing 50.

The pressing part 140 is installed on the nut member 132 and presses the parking lever 120 by the forward and backward movement of the nut member 132. Specifically, the pressing part 140 includes the pressing member 141 through which the pin 132B penetrates to press the parking lever 120, and the elastic member 142 provided between the pressing member 141 and the nut member 132 and elastically supports the pressing member 141.

The pressing member 141 is provided in a cylindrical shape through which the pin 132B penetrates, and a front edge on the parking lever 120 side is bent in order to linearly press the pressing surface 121 of the parking lever 120 when the pressing member 141 moves forward and backward. Also, at least a portion of an outer circumferential surface of the pressing member 141 may be provided to be in contact with the parking lever 120 all the time, and preferably, the bent surface of the pressing member 141 is provided to be in contact with the pressing surface 121 of the parking lever 120 during parking-off.

The elastic member 142 installed to penetrate the pin 132B may be provided as a coil spring, and disposed to have one side supporting the nut body 132A and another side supporting the pressing member 141 in order to provide an elastic force to the pressing member 141 all the time.

In this instance, an elastic modulus of the elastic member 142 is provided to be greater than an elastic modulus of the torsion spring (not shown) supporting the parking lever 120. For example, the elastic member 142 provides an elastic force greater than the torsion spring (not shown) so that the pressing member 141 may press by overcoming a resistance of the parking lever 120, when the nut member 132 or the pressing member 141 moves forward.

The pressing part 140 includes the pressing member 141 and the elastic member 142 elastically supporting the pressing member 141. Accordingly, even when the gear teeth 123 of the parking lever 120 do not normally mesh with the gear teeth 113 of the parking gear 110, the gear teeth 123 may be fixed to the gear teeth 113 using an elastic restoring force of the elastic member 142, and thus a stability of parking-on may be secured.

The housing 50 accommodates the above-described parking gear 110, parking lever 120, parking motor 150, power conversion part 130, and pressing part 140. Also, the housing 50 is provided to surround a driving shaft of the drive motor 41 and the reduction gear part. In this instance, the rotation prevention part (not shown) for preventing rotation of the nut member 132 is provided in a space that accommodates the nut member 132 inside the housing 50. The rotation prevention part (not shown) may be provided to correspond to the rotation prevention surface of the nut member 132.

A force sensor 70 may detect a fastening force between a disc and brake pads. The force sensor 70 may detect a clamping force due to a contact between the disc and the brake pads. Information about the clamping force detected by the force sensor 70 may be transmitted to the controller. The controller may control the brake actuator 40 and the parking actuator 100 according to the clamping force information provided from the force sensor 70.

The force sensor 70 is provided between the power transfer part 30 and the brake actuator 40, and detects the clamping force due to the contact between the disc and the brake pads by detecting a load of the spindle unit 31 or the brake actuator 40.

Hereinafter, an operation of the parking actuator 100 in the electromechanical brake system according to an embodiment is described.

Figure 4:
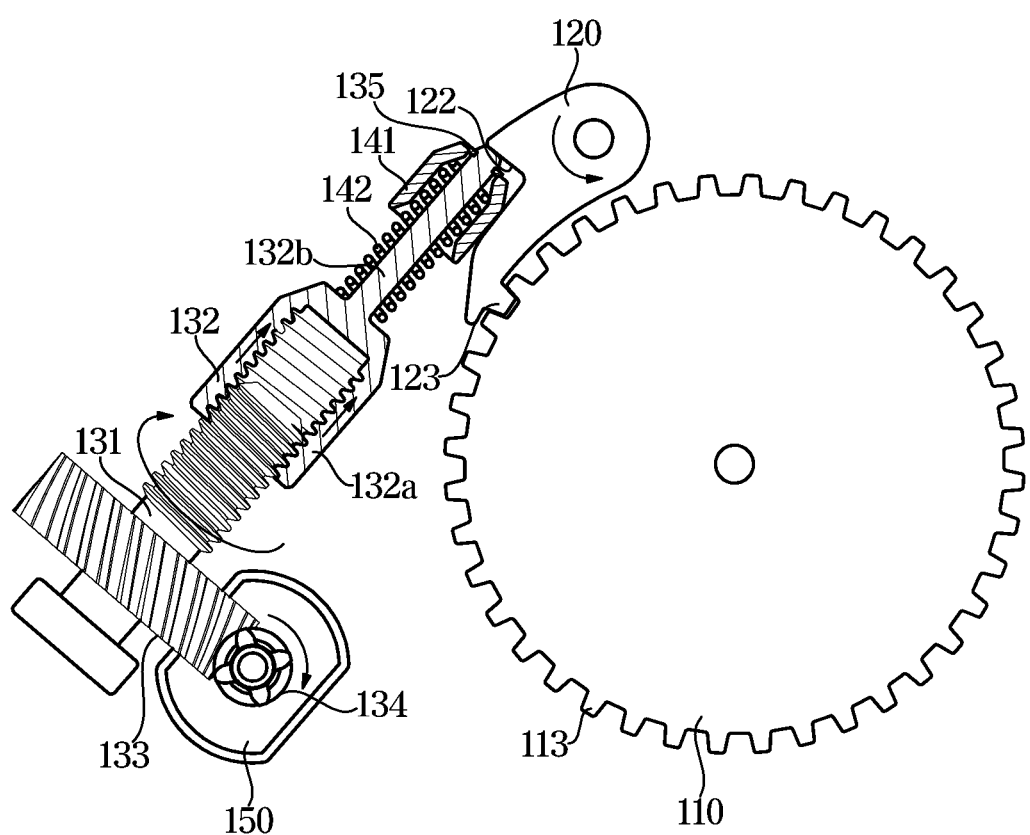
FIG. 4 illustrates a parking-on operation of a parking actuator of an electromechanical brake system according to an embodiment.
Figure 5:
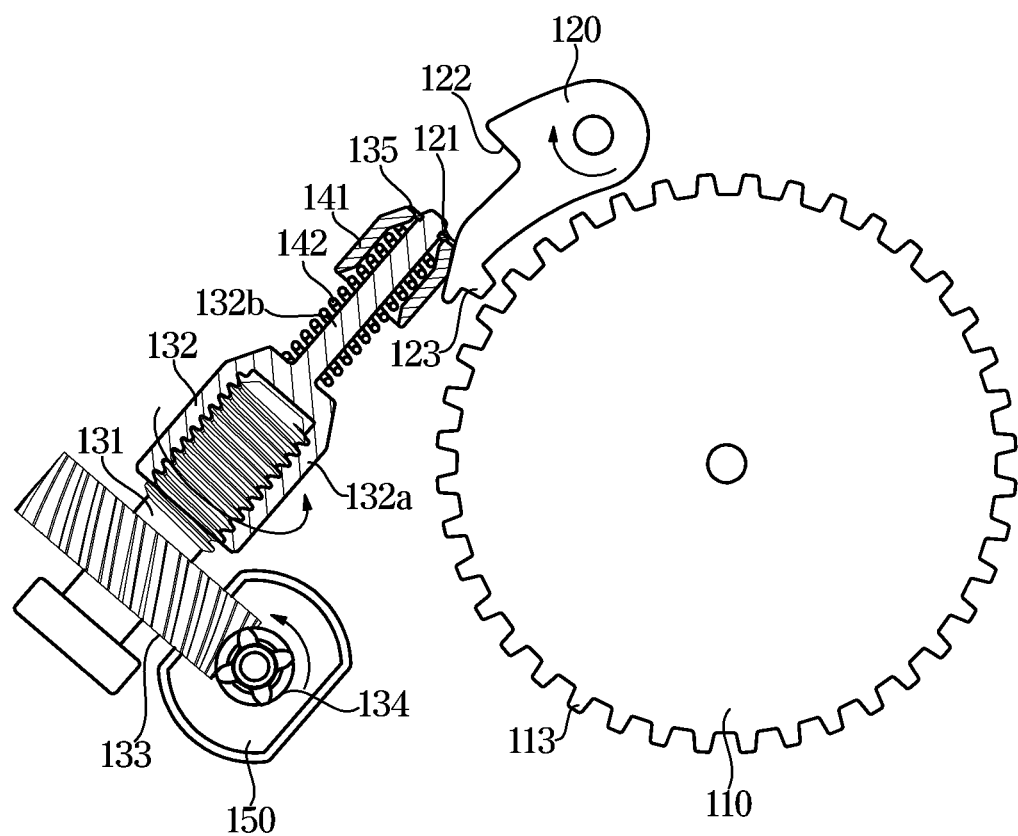
FIG. 5 illustrates a parking-off operation of a parking actuator of an electromechanical brake system according to an embodiment.

FIG. 4 illustrates a parking-on operation of a parking actuator of an electromechanical brake system according to an embodiment. FIG. 5 illustrates a parking-off operation of a parking actuator of an electromechanical brake system according to an embodiment.

The parking actuator 100 of the electromechanical brake system 1 may perform a parking-on operation for maintaining a parking braking state of a vehicle and a parking-off operation for releasing the parking braking of the vehicle.

Referring to FIGS. 4 and 5, the piston 60 presses the pad plate 11 by an operation of the brake actuator 40 that receives an electrical signal from the controller so that the electromechanical brake system implements parking braking. For example, the pad plate 11 is pressed by a driving power of the brake actuator 40 through the spindle unit 31, the nut unit 32, and the piston 60, and thus a brake pad installed on the pad plate 11 presses a disc. Accordingly, vehicle wheels may be braked for parking.

In the parking braking state, the controller performs the parking-on operation by operating the parking actuator 100, thereby may maintain the parking braking state.

Specifically, the controller rotates the spindle member 131 through the first worm gear 134 and the second worm gear 133 by rotating the parking motor 150 in one direction. In this instance, the nut member 132 moves forward relatively with respect to the spindle member 131 by the rotation of the spindle member 131, and the pressing member 141 is elastically supported by the elastic member 142 and moves forward together with the nut member 132 while pressing the pressing surface 121 of the parking lever 120.

The nut member 132 moves forward until one end of the pin 132B comes into contact with the stepped surface 122. The pressing member 141 presses the parking lever 120 while sliding from one end to another end in a state where the pressing member 141 is in contact with a bent surface of the pressing surface 121. In this instance, because an elastic repulsive force by a torsion spring (not shown) of the parking lever 120 is provided to be weaker than an elastic force of the elastic member 142 supporting the pressing member 141, the pressing member 141 may press the parking lever 120.

As the pressing member 141 presses the parking lever 120, the parking lever 120 rotates toward the parking gear 110 side, and thus the gear teeth 123 of the parking lever 120 mesh with the gear teeth 113 of the parking gear 110. That is, the parking gear 110 is fixed by the parking lever 120, and thus the rotation is limited. Accordingly, an operation of the brake actuator 40 including the reduction gear part connected to the parking gear 110, and the like, may be limited.

Meanwhile, in a parking braking hold state described above, the controller performs the parking-off operation by operating the parking actuator 100, thereby releasing the parking braking hold state.

Specifically, the controller rotates the parking motor 150 in a direction opposite to the rotation direction at the parking-on operation. Accordingly, the controller rotates the spindle member 131 through the first worm gear 134 and the second worm gear 133, the nut member 132 advanced moves backward relatively with respect to the spindle member 131, and the pressing member 141 also moves backward.

Accordingly, the parking lever 120 rotates in a direction spaced apart from the parking gear 110 by an elastic restoring force of the torsion spring (not shown), and thus the gear teeth 123 of the parking lever 120 are spaced apart from the gear teeth 113 of the parking gear 110. Thus, the locked state of the parking gear 110 may be released and the parking gear 110 may rotate. As the fixing of the parking gear 110 is released, the brake actuator 40, the reduction gear part, and the like, may be operated. Accordingly, the braking state of the vehicle may be released by the operation of the brake actuator 40.

Figure 6:
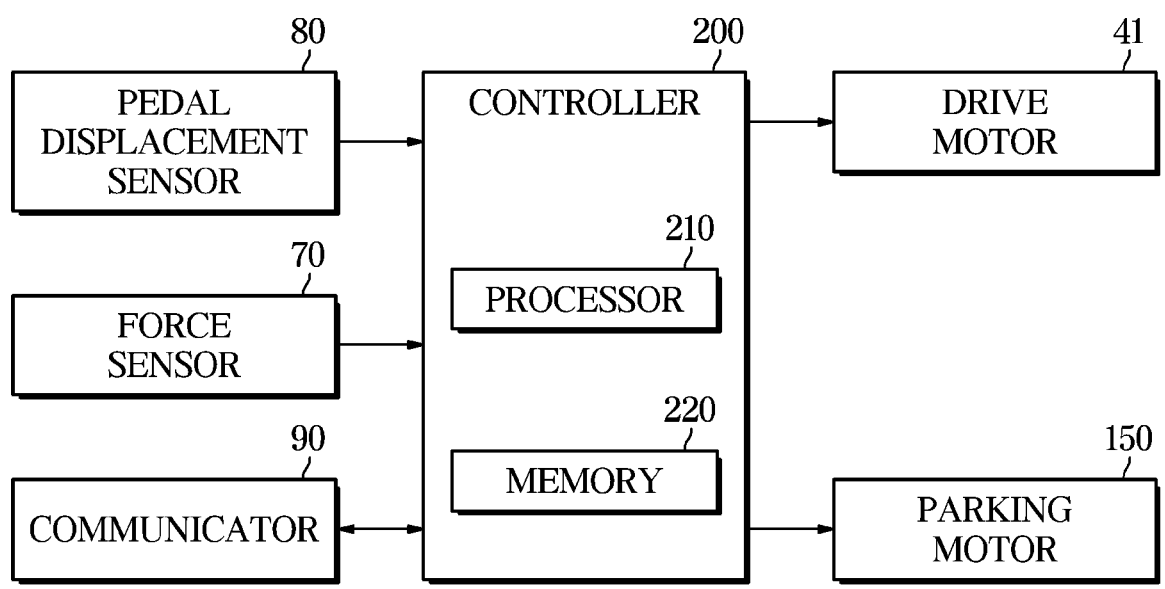
FIG. 6 illustrates a control block of an electromechanical brake system according to an embodiment.

FIG. 6 illustrates a control block of an electromechanical brake system according to an embodiment.

Referring to FIG. 6, the electromechanical brake system may include a controller 200 for performing overall control of the electromechanical brake system.

The controller 200 may be electrically connected to the force sensor 70 and a pedal displacement sensor 80.

The controller 200 may be electrically connected to a communicator 90.

The controller 200 may output a signal for driving the drive motor 41 and the parking motor 150.

The force sensor 70 may detect a clamping force due to a contact between brake pads and a disc mounted on a vehicle wheel.

The pedal displacement sensor 80 may detect a displacement of a brake pedal of a vehicle.

The communicator 90 may transmit and receive a communication signal with an electronic brake system, a driver assistance system, and the like, installed in the vehicle through a vehicle communication network. The communicator 90 may include a controller area network (CAN) transceiver.

The controller 200 may be referred to as an electronic control unit (ECU).

The controller 200 may include a processor 210 and a memory 220.

The memory 220 may store a program for processing or controlling of the processor 210, and various data for operating the electromechanical parking brake system.

The memory 220 may include a volatile memory such as a static random access memory (S-RAM) and dynamic random access memory (D-RAM), and a non-volatile memory such as a flash memory, a read only memory (ROM), an erasable programmable read only memory (EPROM), and the like.

The processor 210 may control overall operations of the electromechanical parking brake system 1.

The controller 200 described above may rotate each of the drive motor 41 and the parking motor 150 in forward or reverse direction. The controller 200 may include an H-bridge circuit including a plurality of electric switching devices to rotate the each of the drive motor 41 and the parking motor 150 in forward or reverse direction.

The controller 200 rotates the drive motor 41 in one direction in a parking apply mode. The rotation of the driver motor 41 in one direction is decelerated through the reduction gear part, thereby may rotate the spindle unit 31 in one direction with great force. When the spindle unit 31 rotates in one direction, a shaft direction of the nut unit 32 may be moved. When the nut unit 32 presses the piston 60, the brake pads installed on the pad plates 11 and 12 press the disc, and thus vehicle wheels may be braked. In a parking release mode, operations may be performed in an opposite manner to the parking apply mode.

The controller 200 may perform the parking apply mode or the parking release mode according to an operation signal of a parking switch operated by a driver or an operation signal generated by a program related to the electronic brake system.

The controller 200 may determine a target clamping force according to the operation signal of the parking switch or a detection signal corresponding to a brake pedal displacement detected through the pedal displacement sensor 80. Also, the controller 200 may determine the target clamping force required for parking, using an operation of the parking switch, the brake pedal displacement, and a wheel speed, vehicle weight and road inclination, received through the communicator 90, and the like. In addition, the controller 200 may directly receive the target clamping force through the communicator 90.

In the parking apply mode, the controller 200 performs the parking-on operation where the parking gear 110 is fixed by engaging the parking lever 120 with the parking gear 110 through the spindle member 131 and the nut member 132 by rotating the parking motor 150 in one direction, in order to maintain a parking braking state.

In the parking release mode, the controller 200 performs the parking-off operation where the fixing of the parking gear 110 is released by separating the parking lever 120 engaged with the parking gear 110 from the parking gear 110 by rotating the parking motor 150 in a direction opposite to the rotation direction of the parking-on operation, in order to release a parking braking hold state.

When parking, the controller 200 performs the parking-on operation by driving the parking motor 150 based on a current clamping force. When the current clamping force reaches the target clamping force by comparing the current clamping force with the target clamping force, the controller 200 drives the parking motor 150 to perform the parking-on operation.

Figure 7:
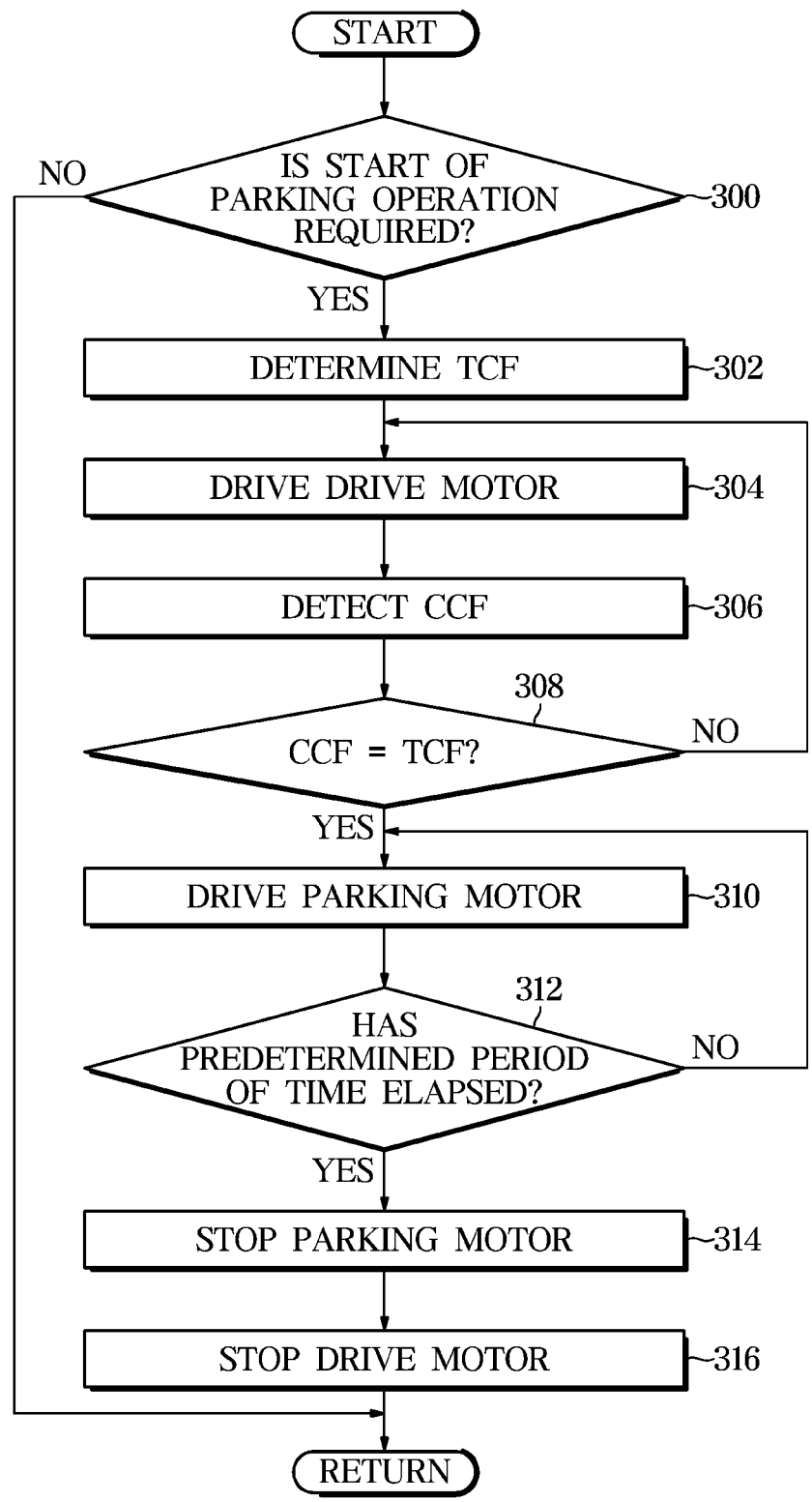
FIG. 7 is a flowchart illustrating a control method of an electromechanical brake system according to an embodiment.

FIG. 7 is a flowchart illustrating a control method of an electromechanical brake system according to an embodiment.

Referring to FIG. 7, a control method of an electromechanical brake system according to an embodiment may include determining whether a start of a parking operation is required (300), determining a target clamping force (TCF) (302), driving the drive motor 41 (304), detecting a current clamping force (CCF) (306), determining whether the CCF reaches the TCF (308), driving the parking motor 150 when the CCF reaches the TCF (310), determining whether a predetermined period of time has elapsed (312), stopping the parking motor 150 (314), and stopping the drive motor 41 (316).

The controller 200 determines whether the start of the parking operation is required. When a parking switch is operated by a driver or a parking operation start is requested by a program related to an operation of the electromechanical brake system, the controller 200 may determine that the start of the parking operation is required.

When it is determined that the start of the parking operation is required, the controller 200 determines the TCF required for parking according to an operation signal of a parking switch or a detection signal corresponding to a brake pedal displacement detected by the pedal displacement sensor 80. Also, the controller 200 may determine the TCF required for parking, using an operation of the parking switch, the brake pedal displacement, and a wheel speed, vehicle weight and road inclination received through the communicator 90, and the like.

The controller 200 performs the parking apply mode and drive the drive motor 41 in one direction to generate the determined TCF. The controller 200 rotates the drive motor 41 in one direction to press the piston 60 through the spindle unit 31 and the nut unit 32, thereby pressing brake pads onto a disc. Accordingly, vehicle wheels may be braked.

In the parking apply mode, the controller 200 detects the CCF through the force sensor 70.

The controller 200 determines whether the CCF reaches the TCF.

When the CCF reaches the TCF, the controller 200 drives the parking motor 150 in one direction for the parking-on operation. The controller 200 performs the parking-on operation where the parking gear 110 is fixed by engaging the parking lever 120 with the parking gear 110 through the spindle member 131 and the nut member 132 by rotating the parking motor 150 in one direction, in order to maintain a parking braking state.

When the predetermined period of time has elapsed after driving the parking motor 150, the controller 200 stops the parking motor 150. In this instance, the predetermined period of time may be a preset time for performing the parking-on operation.

Figure 8:
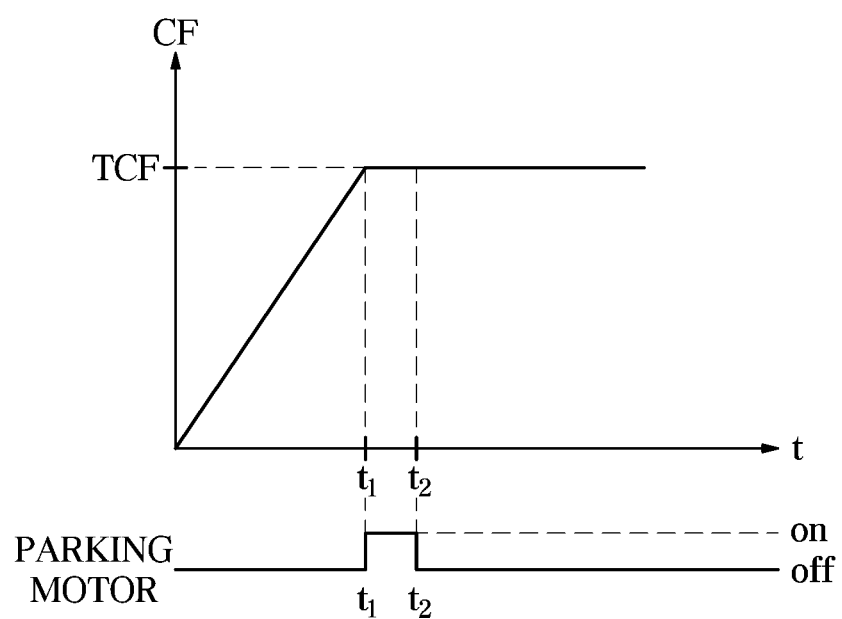
FIG. 8 illustrates an operation of a parking motor of a parking actuator during parking-on, in an electromechanical brake system according to an embodiment.

FIG. 8 illustrates an operation of a parking motor of a parking actuator during parking-on, in an electromechanical brake system according to an embodiment.

Referring to FIG. 8, a horizontal axis represents time (t), and a vertical axis represents a clamping force (CF).

When a clamping force detected through the force sensor 70 reaches a TCF at a point in time t1, a parking-on operation is performed by rotating the parking motor 150 in one direction.

By stopping the parking motor 150 at t2 when the parking-on operation is completed, the parking-on operation is completed.

As such, because the parking-on operation by the parking motor 150 is performed based on the clamping force detected by the force sensor 70 without depending on a current of the drive motor 41, the parking-on operation may be performed at a point in time when the CCF reaches the TCF. Accordingly, the parking-on operation may be maintained accurately and stably.

Referring again to FIG. 7, when the parking motor 150 stops, the controller 200 stops the drive motor 41.

Figure 9:
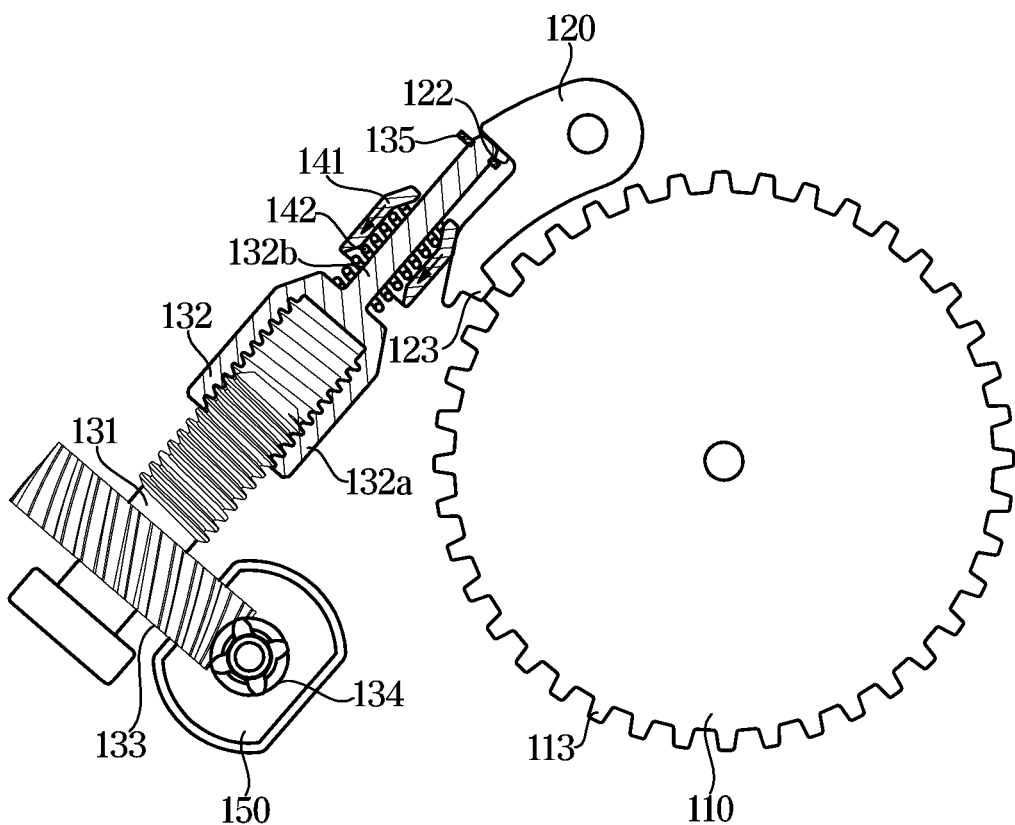
FIG. 9 illustrates disengagement of a parking gear and a parking lever of a parking actuator during parking-on, in an electromechanical brake system according to an embodiment.

FIG. 9 illustrates disengagement of a parking gear and a parking lever of a parking actuator during parking-on, in an electromechanical brake system according to an embodiment.

As shown in FIG. 9, while a parking-on operation is performed, the gear teeth 123 of the parking lever 120 may be disengaged with the gear teeth 113 of the parking gear 110 due to external strong impact or other causes.

Conventionally, even when the parking-on operation is forcibly released after the parking-on operation is completed, it may not be detected.

Figure 10:
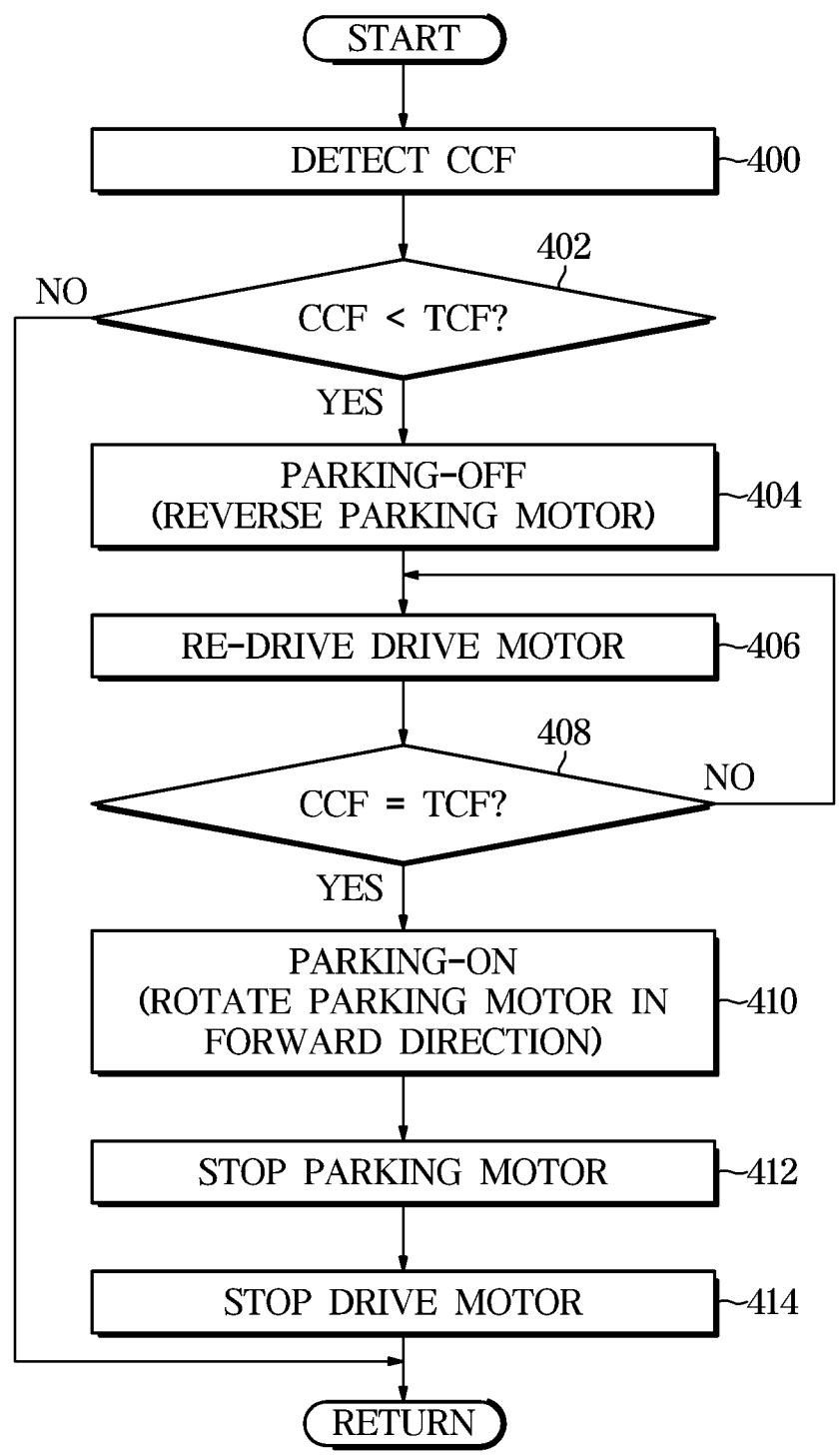
FIG. 10 is a flowchart illustrating a control method of an electromechanical brake system according to another embodiment.

FIG. 10 is a flowchart illustrating a control method of an electromechanical brake system according to another embodiment.

Referring to FIG. 10, a control method of an electromechanical brake system according to another embodiment may include detecting a CCF after a parking-on operation is completed (400), determining whether the CCF is lower than a TCF (402), performing a parking-off operation by reversing the parking motor 150 when the CCF is lower than the TCF (404), re-driving the drive motor 41 to perform a parking apply mode again (406), determining whether the CCF reaches the TCF (408), performing a parking-on operation by rotating the parking motor 150 in forward direction so that the parking lever 120 is engaged with the parking gear 110 again, when the CCF reaches the TCF (410), stopping the parking motor 150 when the parking-on operation is completed (412), and stopping the drive motor 41 (414).

As described above, even when the parking-on operation is completed, the electromechanical brake system according to an embodiment may continuously monitor a clamping force using the force sensor 70. Accordingly, when the parking-on operation is forcibly released after completion of the parking-on operation, the parking-on operation may be automatically performed again.

As is apparent from the above, according to the embodiments of the disclosure, the electromechanical brake system and the control method thereof can stably and accurately implement a parking brake function.

Meanwhile, the aforementioned controller and/or its constituent components may include at least one processor/microprocessor(s) combined with a computer-readable recording medium storing a computer-readable code/algorithm/software. The processor/microprocessor(s) may execute the computer-readable code/algorithm/software stored in the computer-readable recording medium to perform the above-descried functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The disclosed embodiment may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SDD), a silicon disk drive (SDD), a read only memory (ROM), a compact disc read only memory (CD-ROM), a magnetic tape, a floppy disk, an optical recording medium, and the like.

What is claimed is:

1. An electromechanical brake system, comprising:
a pair of pad plates to which a brake pad is attached, respectively, to press a disc that rotates with a wheel;
a carrier on which the pair of pad plates are installed;
a caliper housing slidably installed on the carrier;
a piston movably installed in forward and backward direction inside the caliper housing;
a power transfer part configured to press the pair of pad plates onto the disc by moving the piston;
a brake actuator comprising a drive motor configured to provide a rotational force of the drive motor to the piston, and a reduction gear part configured to decelerate the rotational force of the drive motor and transmit the decelerated rotational force to the power transfer part;
a parking actuator connected to the brake actuator to maintain a parking braking state of a vehicle;
a force sensor configured to detect a clamping force due to a contact between the disc and the brake pad; and
a controller configured to control the brake actuator and the parking actuator,
wherein the controller is configured to control the parking actuator based on the clamping force detected through the force sensor,
wherein the parking actuator comprises:
a parking gear; and
a parking lever having one side hinged and another side provided to be engaged with the parking gear;
wherein the parking gear is concentric with the reduction gear and is connected to the reduction gear such that the parking gear is integrally rotatable together with the reduction gear.

2. The electromechanical brake system of claim 1, wherein the parking actuator comprises:
a parking motor configured to generate power;
a power conversion part comprising a spindle member configured to rotate by receiving a rotational driving force of the parking motor, and a nut member screwed with the spindle member to move forward and backward; and
a pressing part installed on the nut member and configured to press the parking lever by forward and backward movement of the nut member.

3. The electromechanical brake system of claim 2, wherein the controller is configured to control the parking actuator, when the clamping force detected through the force sensor reaches a target clamping force in a parking apply mode.

4. The electromechanical brake system of claim 3, wherein, when the clamping force detected through the force sensor reaches the target clamping force, the controller is configured to engage the parking lever with the parking gear by rotating the parking motor of the parking actuator in one direction to perform a parking-on operation.

5. The electromechanical brake system of claim 4, wherein, when the clamping force detected through the force sensor is lower than the target clamping force after the parking-on operation is completed, the controller is configured to separate the parking lever from the parking gear by rotating the parking motor of the parking actuator in an opposite direction to perform a parking-off operation, and
when the clamping force detected through the force sensor reaches the target clamping force, the controller is configured to perform the parking-on operation again.

6. The electromechanical brake system of claim 5, wherein one surface of the parking lever facing the parking gear is provided with lever gear teeth meshing with gear teeth of the parking gear and the opposing surface of the parking lever is provided with a pressing surface bent to be gradually pressed by the pressing member when the pressing member moves forward,
wherein the parking actuator further comprises a stepped surface formed from the pressing surface in a stepped manner such that the stepped surface prevents the nut member from moving forward excessively.

7. The electromechanical brake system of claim 6, wherein the force sensor is disposed between the power transfer part and the brake actuator.

8. A control method of an electromechanical brake system according to claim 1, the control method comprising:
detecting a clamping force due to a contact between the disc and the brake pad through a force sensor; and
controlling the parking actuator based on the clamping force detected through the force sensor.

9. The control method of claim 8, wherein the controlling of the parking actuator operates the parking actuator for a parking-on operation, when the clamping force detected through the force sensor reaches a target clamping force in a parking apply mode.

10. The control method of claim 9, wherein the controlling of the parking actuator
when the clamping force detected through the force sensor is lower than the target clamping force after the parking-on operation with respect to the parking actuator is completed, operates the parking actuator for a parking-off operation, and
when the clamping force detected through the force sensor reaches the target clamping force, operates the parking actuator for the parking-on operation again.

* * * * *